(12) United States Patent
Robinson

(10) Patent No.: US 8,197,134 B2
(45) Date of Patent: Jun. 12, 2012

(54) THERMOCOUPLE HEAD UNIT

(75) Inventor: Barry Peter Robinson, Hampshire (GB)

(73) Assignee: Weston Aerospace Limited, Hampshire (GB)

( * ) Notice: Subject to any disclaimer, the term of this patent is extended or adjusted under 35 U.S.C. 154(b) by 616 days.

(21) Appl. No.: 12/222,527

(22) Filed: Aug. 11, 2008

(65) Prior Publication Data

US 2009/0141772 A1 Jun. 4, 2009

(30) Foreign Application Priority Data

Aug. 9, 2007 (GB) .................................. 0715594.8

(51) Int. Cl.
*G01K 1/00* (2006.01)
*G01K 7/00* (2006.01)
(52) U.S. Cl. .................. 374/179; 374/208; 374/148
(58) Field of Classification Search .................. 374/179, 374/208, 148

See application file for complete search history.

(56) References Cited

U.S. PATENT DOCUMENTS

| 2,653,983 A | 9/1953 | Best |
| 3,405,225 A | 10/1968 | McHugh, Jr. |

FOREIGN PATENT DOCUMENTS

| GB | 677352 | 8/1952 |
| GB | 2 406 967 | 4/2005 |

OTHER PUBLICATIONS

Great Britain Search Report for GB Application No. 0715594.8, dated Nov. 30, 2007.
EP Search Report dated Mar. 11, 2011 in EP 08 25 2400.

*Primary Examiner* — Lisa Caputo
*Assistant Examiner* — Mirellys Jagan
(74) *Attorney, Agent, or Firm* — Nixon & Vanderhye P.C.

(57) ABSTRACT

A mounting terminal head of a thermocouple head unit having a metal casing for an end of a thermocouple wire, and thermocouple signal terminals 4 for connection to a thermocouple wire. The thermocouple head unit includes an insulating support member 8 extending around the outside of the thermocouple head unit and supporting the thermocouple signal terminals.

7 Claims, 3 Drawing Sheets

THERMOCOUPLE HEAD UNIT

This application claims priority to Great Britain Application No. 0715594.8 filed 9 Aug. 2007, the entire contents of each of which are hereby incorporated by reference.

The present invention is concerned with thermocouple units. In particular, it is concerned with the mounting terminal head of a thermocouple unit.

Thermocouples typically comprise two wires of different metals joined at their ends to form a loop. A temperature difference between the joined ends causes a current to flow around the loop, or a potential difference to be created. The difference in temperature between the two ends (the hot and cold ends) can be determined by measuring the potential difference (or electromotive force—emf) set up when the circuit is open. If the temperature of the cold end is known, one can then determine the temperature of the hot end (or vice versa).

A thermocouple unit consists of one, two or more thermocouple elements. A thermocouple element may be mineral insulated and protected by a metal sheath. The measuring end of the thermocouple element is placed in the location which temperature is to be measured (e.g. a gas stream in a gas turbine), while the other end is placed in a thermocouple head with the non-measuring (typically cold) ends of the wires connected to a measuring circuit. When two or more elements are used, they are normally connected in parallel to provide average temperature measurements. The elements' wires are connected together inside the thermocouple head and then connected to two output terminals made from the same material as the wires. Several thermocouple units can be connected together using a harness connected to the unit terminals.

The thermocouple head has to fulfil the following functions:
 to protect fragile thermocouple wires
 to house additional components such as ballast resistors
 to provide mounting for the thermocouple unit
 to provide connection to the harness using terminals As discussed above, the loop is typically enclosed within a protective tube or sheath. The sensing (typically hot) end of the loop is placed in the location where temperature is to be measured (e.g. a gas stream in an aircraft engine or a gas turbine). The other remote or measuring end of the loop is held within a thermocouple head unit which includes means for connecting the wire ends to measuring circuitry. Typically the head is mounted on the outside of the element enclosing the location which temperature is being measured or monitored (e.g. the outside of the casing of an aero engine or gas turbine).

Figure 2:
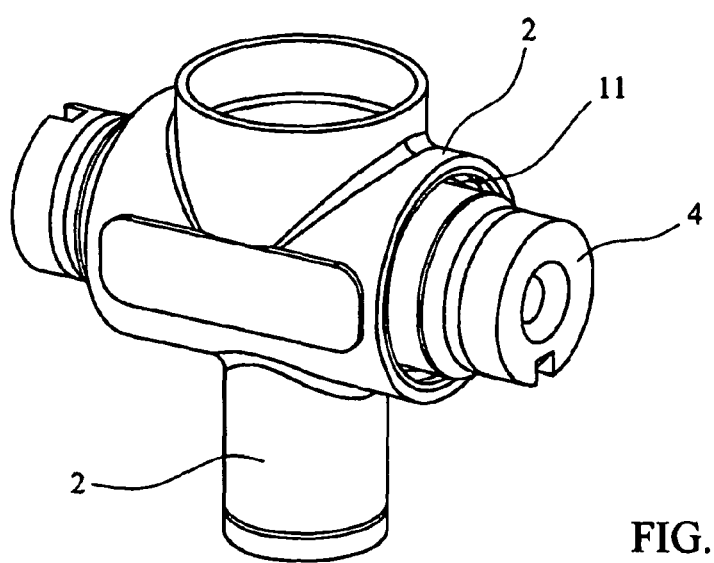
Figure 3:
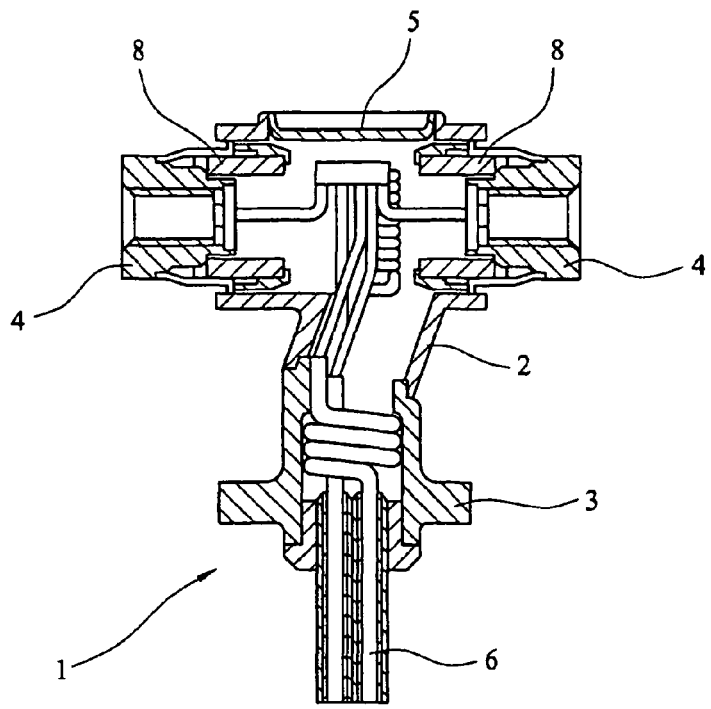
Figure 4:
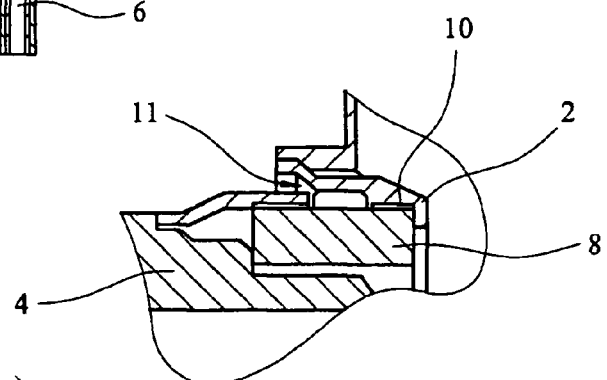

Known thermocouple heads (see FIGS. 2 to 4 and, e.g., U.S. Pat. No. 3,405,225) are made from metal. The head of a typical thermocouple head unit 1 such as that shown in FIGS. 2 to 4 is manufactured from a stainless steel housing 2 welded to a stainless steel flange 3. The thermocouple signal terminals 4 for connecting the cold, measuring or remote ends 5 of the thermocouples 6 to the measuring or monitoring circuitry 7 are vacuum brazed metal/ceramic assemblies 4 welded into ports in the body or housing 2. The known arrangements have ceramic insulation 8 between the thermocouple terminals 4 and the thermocouple head body 2. The known thermocouple heads include a high number of separate parts and their production or manufacture is multi-operation with vacuum brazing and TIG (Tungsten Inert Gas) welding. They are therefore relatively difficult and expensive to make.

The known thermocouple head design shown in FIGS. 2 to 4 has two cylindrical ceramic parts 8 (not shown in FIG. 2) insulating the terminals 4 from the metal body 2, one ceramic component for each terminal. The ceramic insulators have two metallised areas 10 which are brazed to the body 2 and to the terminal 4. Brazing provides a sealed head. The insulating ceramic parts 8 are small and therefore the insulating path between the two metallised parts 10 is short and subject to easy contamination resulting in low insulation resistance and failure of the thermocouple. This is a serious problem on, for example, aero engines where contamination is trapped in the cavity (11—see FIG. 4) between the housing or body 2 and ceramic insulator 2.

The insulating parts 8 cannot be made longer in the design of FIGS. 2 to 4 because it would require much longer ceramic insulators resulting in the change of the mounting dimensions of the harness in use, which supports the mounting head. This mounting dimension is fixed for a given space envelope of the engine on which the thermocouple mounting head is to be fixed and cannot be changed. Longer ceramic insulators would also make the construction weaker and more prone to failures under high level of vibrations.

The present invention provides a thermocouple unit as defined in independent claim 1 to which reference should now be made. Some preferred features of the invention are set out in claims 2 to 4.

A preferred embodiment of the invention will be described, by way of example only, with reference to the attached figures. The figures and accompanying description are only for the purposes of illustrating one or more preferred embodiments of the invention and are not to be construed as unifying the invention, limiting the invention or limiting the appending claims. The skilled man will readily and easily envisage alternative embodiments of the invention.

Figure 1:
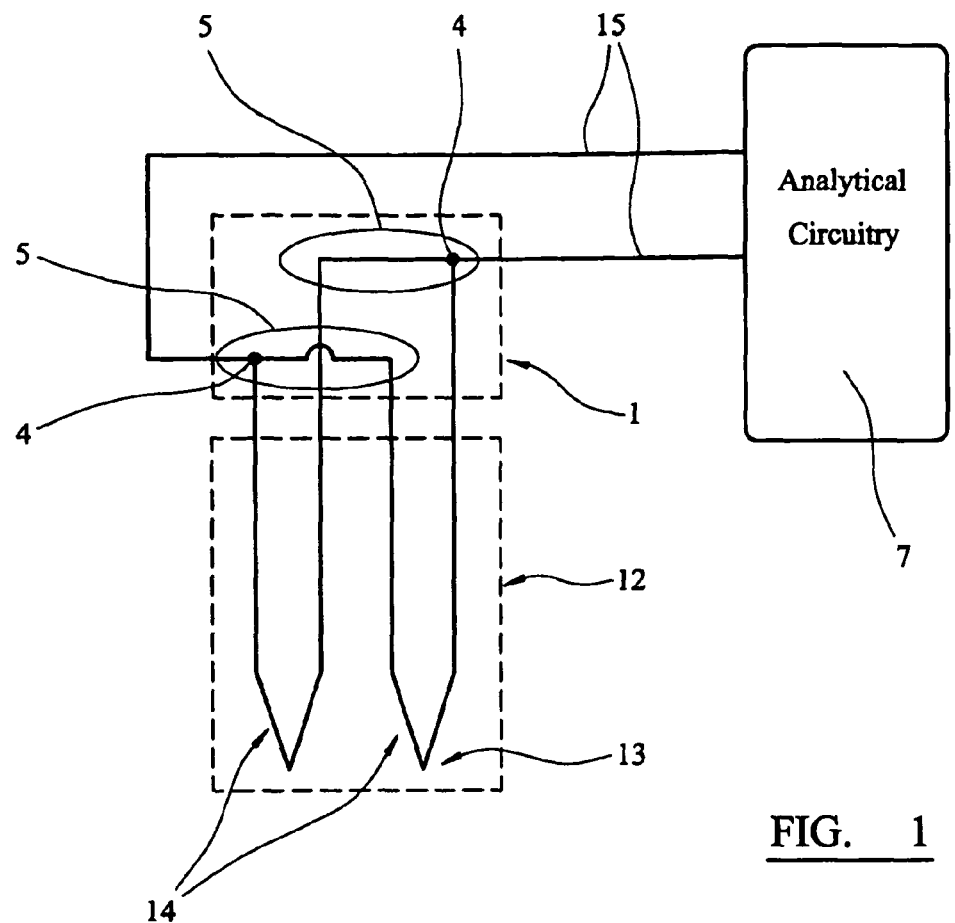
Figure 7:
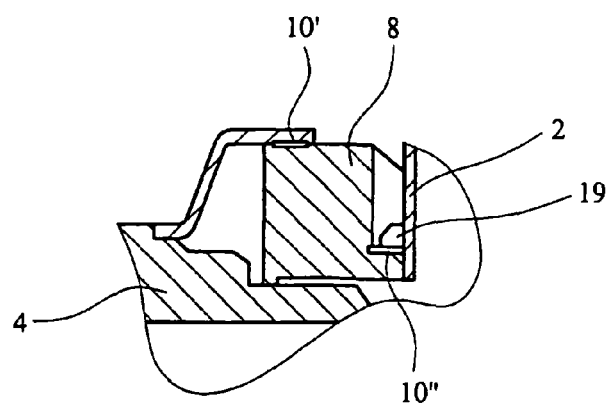
Figure 5:
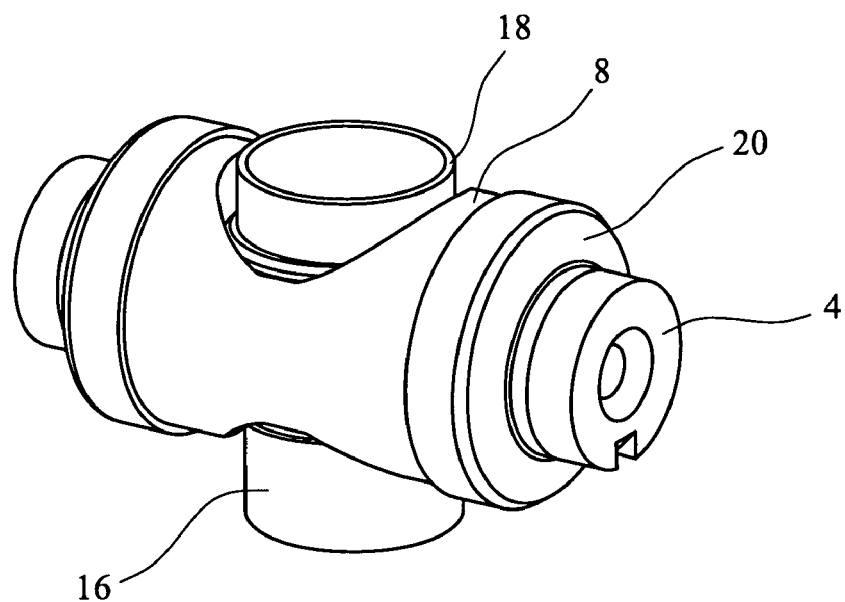
Figure 6:
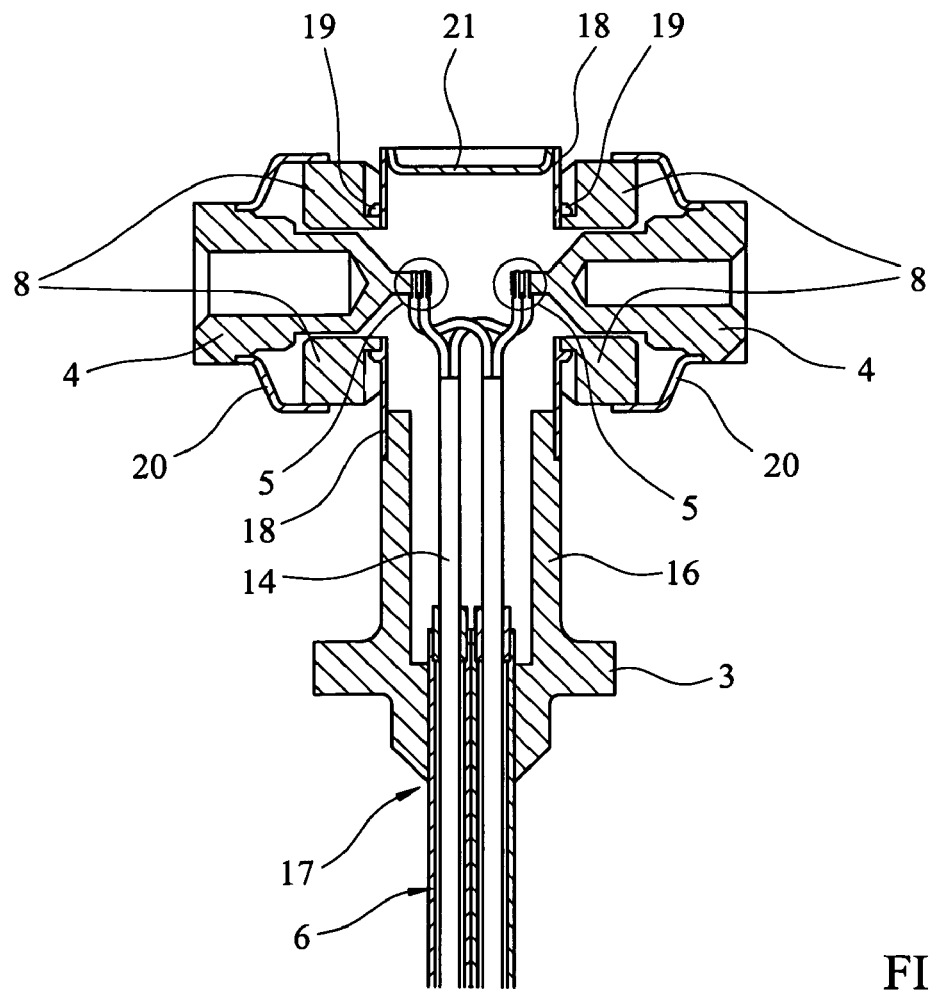

In the figures
 FIG. 1 is a diagram illustrating a system for monitoring temperature using a thermocouple having a pair of thermocouple elements;
 FIG. 2 is a perspective view of an end of a known thermocouple head;
 FIG. 3 is a cross-sectional illustration of the thermocouple head unit construction of FIG. 2;
 FIG. 4 is an illustration of a detail of the head unit of FIGS. 2 and 3;
 FIG. 5 is a perspective view of an end of a thermocouple head unit embodying the invention;
 FIG. 6 is a cross-sectional illustration of the thermocouple head unit of FIG. 5; and
 FIG. 7 is an illustration of a detail of the thermocouple head unit of FIGS. 5 and 6.

Referring to FIG. 1, this shows in schematic form a thermocouple unit 1 having two thermocouple elements 2 of, for example, type K.

In use, a pair of thermocouple elements is housed in a probe 12. The probe 12 is mounted, for example, in an aero engine or gas turbine such that the tip 13 constitutes a hot junction located inside the gas stream in the engine or turbine to measure the gas temperature in the engine or turbine. For an aero engine the temperature might typically be of the order of 800° C. to 1200° C.

At the other end, the thermocouple wires terminate in a head 1 mounted on the exterior of the, e.g., aero engine or gas turbine. For an aero engine, the outside is typically at a much lower temperature (of the order of 300° C. to 600° C.) to the inside.

The thermocouple wires 14 are connected to thermocouple terminals 4 in the thermocouple head 1. Wires 15 are connected to the terminals to connect the thermocouple wires to measuring circuitry 7. The measuring circuitry determines the temperature difference between the tip 13 and the cold junctions of the thermocouple from the voltage or potential difference between the thermocouple wires. The measuring circuitry has a temperature sensor to determine the temperature of the cold junction and can therefore determine the temperature of the hot junction or tip 13.

A number of thermocouple units may be connected in parallel in the manner described in GB 2,344,892.

The known thermocouple heads (see FIGS. 2 and 3) comprise a metal (e.g. stainless steel) body or housing 2 welded to a metal (e.g. stainless steel) flange 3. The thermocouple signal terminals 4 are vacuum brazed metal/ceramic assemblies welded into ports on the metal body 2. The ceramic components 8 surrounding the terminal assemblies 4 insulate the respective terminals from the body (earth).

The vacuum brazed signal terminal subassemblies for providing connections to wires and hence to the analytical circuitry are located and TIG welded into ports in the head 1. The terminal connection bushes are each insulated from the metal thermocouple head body using a ceramic collar 8.

As shown in FIG. 4, the known ceramic insulators or collars 8 have two metallised areas 10 which are brazed to the metal body 2 and to the respective terminal 4. The insulating ceramic collars are small and therefore the insulating parts between the two metallised parts 10 (which form part of the brazed points) is short and subject to easy contamination resulting in low insulation resistance and failure of the thermocouple. This is a potentially serious problem in at least aero engines where contamination can be caught in the cavity 11 between the ceramic collar 8 and the metal body 2.

The insulating parts cannot be made longer in the known design illustrated in FIGS. 2 to 4 because that would require much longer ceramic insulators. The ceramic insulators cannot simply be made longer because that would increase the overall size of the thermocouple head unit. The head unit cannot be increased in size without also changing the dimensions of the mounting harness. This is not possible in at least aero engines which the mounting dimension is fixed for a give space envelope of the engine. Furthermore simply lengthening the ceramic insulators whiles leaving the rest of the head unit unchanged would weaken the unit and make it more prone to failure when subjected to high levels of vibration.

A thermocouple head embodying the present invention is shown in FIGS. 5 to 7. Where appropriate, the same reference numerals to those of FIGS. 2 to 4, are used to denote the equivalent elements. The head unit of FIGS. 5 to 7 has a cylindrical metal (made from a low thermal expansion coefficient alloy such as the chrome-iron NILO K (trade mark) (Kovar) alloy so as to reduce differential expansion of housing and ceramic components) lower housing or casing portion 16 including a flange portion 3 for fixing onto a surface (e.g. the outside of a turbine casing). The bottom of the housing includes holes 17 through which two sets of mineral insulated thermocouple wires 14 comprising thermocouples pass. A tubular metal upper housing portion 18 is welded to the lower housing portion 16 and includes two holes or ports each for receiving an end of a metal thermocouple terminal 4. A single ceramic insulating element 8 is brazed to supporting projections 19 on the metal upper housing 18. The ceramic insulating element 8 supports the thermocouple terminal units 4. A metal ferrule 20 is brazed to the ceramic insulating unit 8 and welded to a respective terminal 4.

The top or end of upper housing portion 18 is sealed by a removable end cap 21.

The ceramic insulating element 8 is made from a ceramic suitable for high temperature operation such as high purity Alumina or Alumina and Zirconia.

The terminals 4 are made from the same material as the thermocouple wires 14 to which they are joined. For a type K thermocouple element ($K^+$ and $K^-$), one terminal is made from e.g. Alumel™ (Alumel is a metal based alloy containing about 5 per cent Aluminium—Alumel is a trade mark of Concept Alloys LLC) and has the Alumel™ wire(s) connected thereto while the other is made from, e.g. Chromel™ and has the Chromel™ (Chromel is a nickel-based alloy containing about 10% chromium—Chromel is a trade mark of Concept Alloys LLC) wire(s) connected, thereto. The ferrule 20 is made the same material as the terminals 4.

A portion 10 of the ceramic element 8 is metallised using, for example, the well known molybdenum manganese process. The ferrule 20 is then brazed to this metallised portion 10 and welded to the terminal 4. The ferrule 20 is flexible to accommodate different thermal expansion of the metal and ceramic elements of the unit.

As discussed above the conductive materials which make up the two thermocouple wires (e.g. Chromel and Alumel) are each used to make terminals 4. Each terminal is one half of a male/female connection. A terminal 4 could be in the form of a bolt or a threaded socket (hole). For bolt terminals a harness is attached using nuts, for socket terminals a harness is attached using bolts. In the embodiment of FIG. 5, the terminals 4 are female and are capable of receiving male (bolt) connectors. In an alternative embodiment, they could be male and for insertion into female connectors.

A protective sheath surrounds the different wires 14 of a K-type thermocouple element 6. The wires of the thermocouple element 6 pass through the surface on which the head 1 is mounted and finish at the sensing tip 13 (not shown in FIG. 5) at the location which temperature is being monitored. The wires of the two thermocouple elements are connected in parallel to respective thermocouple terminals 4.

The head design of FIGS. 5 to 7 uses one large ceramic insulation block 8 serving two terminals 4. The ceramic part has a much longer and exposed insulation path than the known design illustrated in FIGS. 2 to 4 and is easily accessible from outside enabling its cleaning and therefore reducing the risk of contamination and low insulation resistance. At the same time the space envelope is not changed. The second benefit of the design is increased mechanical strength of the ceramic block offering higher tightening torque for the attaching mating harness. A higher tightening torque helps ensure that the mounting harness to which the head is connected will not become detached from the head as a result of vibrations.

The invention claimed is:

1. A thermocouple head unit for connecting a thermocouple to measurement or monitoring apparatus or circuits, said unit comprising:
   a metal casing for an end of a thermocouple wire, the casing including a mounting portion for mounting onto a surface to support the thermocouple head unit, and having at least one port;
   at least one conductive thermocouple signal terminals having a portion passing through said at least one port, each signal terminal having a first portion within the casing for connection to a thermocouple wire and a second portion outside the casing for electrical connection of the first portion to said measurement or mounting apparatus or circuits; and
   an insulating support member for supporting the at least one thermocouple signal terminal in or through the at least one port in the casing, the insulating support member extending around the outside circumference of the metal casing and including at least one port through which a portion of the at least one thermocouple signal terminal passes.

2. A thermocouple head unit according to claim 1 wherein the insulating support member is made from a ceramic material.

3. A thermocouple head unit according to claim 1 further comprising at least one flexible metal ferrule fixed to said at least one thermocouple signal element and said insulating support member.

4. A thermocouple head unit according to claim 1 wherein there are two thermocouple signal terminals and the casing has two ports, each port receiving one of said two thermocouple signal terminals, and wherein the insulating support member has two ports, each insulating support member port supporting one of said two thermocouple signal terminals.

5. A thermocouple head unit according to claim 4 wherein the insulating support member is made from a ceramic material.

6. A thermocouple head unit according to claim 4 further comprising at least one flexible metal ferrule fixed to said at least one thermocouple signal element and said insulating support member.

7. A thermocouple head unit for connecting a thermocouple to measurement or monitoring apparatus or circuits, said unit comprising:

a metal casing for an end of a thermocouple wire, the casing including a mounting portion for mounting onto a surface to support the thermocouple head unit, and having two ports;

two conductive thermocouple signal terminals, said terminals having a portion passing through a respective port, the signal terminals each having a first portion within the casing for connection to a thermocouple wire and a second portion outside the casing for electrical connection of the first portion to said measurement or mounting apparatus or circuits; and a ceramic insulating support member for supporting the thermocouple signal terminals in or through said respective ports in the casing, the insulating support member extending around the outside circumference of the metal casing and including two ports through which a portion of the thermocouple signal terminals pass, each insulating support member port supporting one thermocouple signal terminal.

* * * * *